United States Patent
Hirotsu et al.

(10) Patent No.: US 6,363,751 B1
(45) Date of Patent: Apr. 2, 2002

(54) APPARATUS FOR BEND-SHAPING A GLASS PLATE

(75) Inventors: Takashi Hirotsu, Yokohama; Kazuyoshi Ohtani, Sagamihara; Teruji Nagaoka, Aikawa-machi, all of (JP)

(73) Assignee: Asahi Glass Company Ltd., Tokyo (JP)

( * ) Notice: Subject to any disclaimer, the term of this patent is extended or adjusted under 35 U.S.C. 154(b) by 39 days.

(21) Appl. No.: 08/864,923

(22) Filed: May 29, 1997

Related U.S. Application Data

(63) Continuation of application No. 08/035,032, filed on Mar. 22, 1993, now Pat. No. 6,014,873, which is a continuation-in-part of application No. 07/765,889, filed on Sep. 26, 1991, now abandoned.

(30) Foreign Application Priority Data

Sep. 26, 1990 (JP) .............................. 2-256229

(51) Int. Cl.⁷ .............................. C03B 40/02
(52) U.S. Cl. .................. 65/182.2; 65/25.4; 65/273; 65/287
(58) Field of Search ............ 65/25.4, 104, 182.2, 65/268, 273, 106, 287, 288, 289, 290, 291

(56) References Cited

U.S. PATENT DOCUMENTS

| | | | |
|---|---|---|---|
| 3,293,015 A | * | 12/1966 | Fredley et al. |
| 3,332,760 A | * | 7/1967 | McMaster et al. |
| 3,375,093 A | * | 3/1968 | Reising |
| 3,375,094 A | * | 3/1968 | McMaster et al. |
| 3,409,422 A | * | 11/1968 | Gulotta |
| 3,526,491 A | * | 9/1970 | Sharrock |
| 3,594,149 A | * | 7/1971 | Pickavance et al. |
| 4,292,065 A | * | 9/1981 | Nedelec et al. ............. 65/104 |
| 5,009,695 A | * | 4/1991 | Kuster et al. ............. 65/182.2 |
| 5,522,912 A | * | 6/1996 | Kobayashi et al. |

FOREIGN PATENT DOCUMENTS

| | | | |
|---|---|---|---|
| DE | 14996077 | * | 2/1969 |
| EP | 0 041 899 | * | 12/1981 |
| EP | 0 143 691 | * | 6/1985 |
| EP | 0 346 200 | * | 12/1989 |
| FR | 1520204 | * | 4/1967 |
| FR | 2133725 | * | 12/1972 |
| FR | 2442219 | * | 6/1980 |

* cited by examiner

Primary Examiner—Sean Vincent
(74) Attorney, Agent, or Firm—Oblon, Spivak, McClelland, Maier & Neustadt, P.C.

(57) ABSTRACT

A method and apparatus for manufacturing a curved sheet of glass which includes a heating furnace for heating a sheet of glass therein, the heating furnace having an outlet opening for discharging a curved sheet of glass, and an array of beds housed in the furnace for transferring a sheet of glass successively over the beds in the furnace in a first direction toward the outlet opening while shaping the sheet of glass complementarily to an upper surface of the beds, each of the beds having a plurality of hot air ejecting holes for ejecting hot air to keep the sheet of glass out of contact with the beds, the beds including a final bed disposed near the outlet opening and inclined upwardly toward the outlet opening, the final bed having an upper panel including at least a portion curved in the first direction near the outlet opening to curve the sheet of glass in the first direction.

9 Claims, 5 Drawing Sheets

APPARATUS FOR BEND-SHAPING A GLASS PLATE

This is a Continuation of application Ser. No. 08/035,032 filed on Mar. 22, 1993 now U.S. Pat. No. 6,014,873 which is a continuation-in-part of Ser. No. 07/765,889 filed on Sep. 26, 1991, now abandoned.

BACKGROUND OF THE INVENTION

1. Field of the Invention

The present invention relates to a process for bend-shaping a glass plate so that the glass plate has a complexly curved face and an apparatus for carrying out the process.

2. Discussion of Background

In automobile industries, there has been an increasing demand for a glass plate having a complexly curved face, i.e. a glass plate 8 having a complexly curved face wherein a flat glass plate is bend-shaped with two different radius of curvatures R1 and R2 in its longitudinal and transversal directions as shown in FIG. 3.

FIG. 4 shows an example of a bend-shaping apparatus proposed as an apparatus for bend-shaping a glass plate to have a complexly curved face (Japanese Examined Patent Publication No. 10331/1974). With use of a bend-shaping apparatus 10, a glass plate 8 is bend-shaped to have a radius R2 along the axis perpendicular to the transferring direction while it is transferred on hearth beds 13, 13 and then, the glass plate 8 is bend-shaped to have a radius R1 along the axis of the transferring direction on hearth beds 14, 16 each of which has a portion curved along the axis of the transferring direction, and then it is cooled and strengthened at a blowing port 18, whereby a complexly curved face is formed in the glass plate 8 as shown in FIG. 3.

A shaping furnace constitutes a very large portion of the investment for such glass manufacture line. Accordingly, it is advantageous if equipment for a conventional glass plate manufacture line for producing a glass plate having a simply curved face can be used for a glass plate manufacture line which is used for producing a glass plate having a complexly curved face. In particular, it is advantageous if the shaping furnace for the conventional manufacture line can be used in common. However, there were many difficulties in using the same shaping furnace for both types of curved glass plates. Namely, when it is desired that the glass plate manufacture line for a glass plate having a simply curved face, which is already equipped, is used for a glass plate manufacture line for a glass plate having a complexly curved face as shown in FIG. 4, it is necessary to replace the hearth beds 14, 16 and the blowing port 18 in the glass plate manufacture line for a glass plate having a simply curved face by those for a glass plate having a complexly curved face. In the conventional bend-shaping apparatus for producing a glass plate having a complexly curved face, however, there was a large distance in the vertical direction between the level H2 of the position where the glass plate is not yet bend-shaped and the level H1 of the position where the glass plate has been bend-shaped. The distance is indicated by H in FIG. 4. Namely, if the shaping furnace of the glass plate manufacture line for a glass plate having a simple curved face is to be used in common for the glass plate manufacture line for a glass plate having a complexly curved face, it is necessary to provide a special raising means for raising a glass plate, which has been bend-shaped in the longitudinal direction, from the lower level H1 to the higher level H2 in a case that the glass plate having a complexly curved face is to be manufactured.

The lower level H1 varies depending not only on the difference between the nature of the glass plate having a simply curved face and the nature of the glass plate having a complexly curved face but also on the specification of the glass plate having the complexly curved face. Namely, such raising means has to be either of an inclusive use which is separately prepared depending on the specification for bend-shaping the glass plate, or has to be used after the adjustment of an existing raising means depending on the specification. The preparation of several types of raising means for inclusive use depending on the type of glass plate is not preferable because a large investment for equipment is required. The adjustment of the existing raising means is not practical because much time and labor are required when the type of glass plate to be manufactured is changed. In addition, in practice, there are many difficulties from a technical viewpoint to raise the glass plate from the lower level H1 to the higher level H2.

Namely, in the conventional glass plate bend-shaping line for bend-shaping a glass plate having a simple curved face, the distance L between a shaping furnace 12 and a post-treating conveyor 20 is determined to be short (generally, several meters or shorter) in order to reduce equipment space as much as possible. Accordingly, when the shaping furnace in the existing glass plate shaping line for a glass plate having a simply curved face is used for the production of a glass plate having a complexly curved face, it is necessary to raise the glass plate from the lower level H1 to the higher level H2 in the relatively short distance L.

In such conditions, it is very difficult to stably transfer the glass plate in that distance because the radius of curvature and the gradient of the transferring surface of the blowing port 18 are different from those of the transferring surface of the raising means. Such difficulty can be eliminated if the distance L can be enlarged to more than 10 meters. However, this does not meet the demand of saving space, and it is impossible to use the existing manufacture line for a glass plate having a simple curved face for the manufacture line for a glass plate having a complexly curved face.

SUMMARY OF THE INVENTION

It is an object of the present invention to eliminate the disadvantage described above and to provide a process for bend-shaping a glass having a complexly curved face and an apparatus for carrying out the process, which enables the utilization of most of the equipment of the existing manufacture line for a glass plate having a simple curved face and which is sufficient for only simple change of equipment.

It is another object of the present invention to provide a process for bend-shaping a glass plate having a complexly curved face and an apparatus for carrying out the process which can operate in a small space of equipment.

Another object of the present invention is to permit the common use of the shaping furnace for a glass plate having a simply curved face and the shaping furnace for a glass plate having a complexly curved face in spite of various kinds of specification.

Another object of the present invention is to standardize an amount of a decrease in elevation of a glass plate from a higher position H2 (the position of the glass plate before falling) to a lower position H1 (the position after the falling) during the operation of shaping the glass plate to have a complexly curved face, so that a raising means to raise the glass plate can be used commonly irrespective of the specification of bending the glass plate having a complexly curved face. Thus labor necessary for adjusting the equipment for bend-shaping the glass plate at the time of changing the specification of the glass plate can be reduced.

It is another object of the present invention to improve stability in raising the bent glass plate by reducing the length of transferring the glass plate.

In accordance with the present invention, there is provided a process for bend-shaping a glass plate by heating the glass plate to a temperature which is close to a softening temperature of the glass plate, while the glass plate is transferred in a transferring direction along a transferring surface in a shaping furnace, to thereby bend the glass plate, by its own deadweight, into a shape corresponding to the shape of the transferring surface, comprising the steps of:

complexly bending the glass plate in the shaping furnace by transferring the glass plate along a complexly bending transferring surface comprising hearth beds having bend-shaping surfaces, said complexly bending transferring surface having a complexly curved face which is upwardly projected with predetermined radius of curvatures along both an axis of the transferring direction and an axis perpendicular to the transferring direction, said transferring surface being formed of a continuous surface having substantially the same radius of curvatures as the surface of the glass plate to be formed, and said transferring surface having an upward gradient portion at at least an area near an exit of the shaping furnace, whereby the glass plate is bent into a shape which substantially corresponds to that of the complexly bending transferring surface;

transferring the glass plate through the shaping furnace by utilizing a driving chain having holders for holding the glass plate in a floating state and a pusher for pushing the held glass plate when the driving chain is driven in the transferring direction; and cooling and strengthening the glass plate by transferring the glass plate, which has been delivered through the exit of the shaping furnace, along a cooling transferring surface which has a complexly curved face so as to be substantially continuous to that of the complexly bending transferring surface and which has a downward gradient portion in at least a part of the cooling transferring surface;

wherein:

the glass plate is held in the floating state by a gas layer formed of gas which is blown from the lower part of the complexly bending transferring surface when the glass plate is transferred along the complexly bending transferring surface.

Further, the process for bend-shaping a glass plate of the present invention may have a moving step of moving the glass plate to the level of a post-treating transferring path after the cooling and transferring step.

Further, the process for bend-shaping a glass plate according to the present invention comprises, before the complexly bending step, a simple bending step of transferring the glass plate in a substantially horizontal direction along a simple bending transferring surface having a simple curved face which is upwardly projected with predetermined radius of curvatures along the axis perpendicular to the transferring direction in the shaping furnace, whereby the glass plate is bent into a shape which substantially correspond to that of the simple bending transferring surface.

Further, in accordance with the present invention, there is a step of transferring in a floating state the glass plate by means of a transferring surface in the shaping furnace before the complex bending, said transferring surface being detachable and replaceable so that gradient in the transferring direction is gradually changed to have a predetermined gradient depending on an upward gradient of the complexly bending transferring surface.

Further, in accordance with the present invention, there is provided an apparatus for bend-shaping a glass plate wherein the glass plate is heated to a temperature which is close to a softening temperature of the glass while the glass plate is transferred in a transferring direction along a transferring surface in a shaping furnace, to thereby bend by its deadweight the glass plate into a shape corresponding substantially to that of the transferring surface which comprises:

a shaping furnace for heating the glass plate to a temperature which is close to a softening temperature of the glass plate, a complexly bending transferring surface positioned in the shaping furnace, which has a complexly curved face so as to upwardly project along both an axis of the transferring direction and an axis perpendicular to the transferring direction and which has an upward gradient portion at at least an area near an exit of the shaping furnace, said transferring surface being formed of a continuous surface having substantially the same radius of curvatures as the surface of the glass plate to be formed, and a cooling transferring surface which has a complexly curved face so as to be substantially continuous to that of the complexly bending transferring surface and which has a downward gradient portion in at least a part of the cooling transferring surface; and a glass plate cooling and strengthening means disposed near the cooling transferring surface;

wherein:

the complexly bending transferring surface is provided by hearth beds in the shaping furnace, said hearth beds defining bend-shaping surfaces; and the complexly bending transferring surface is provided with a holding means which ejects gas from the lower part of the complexly bending transferring surface to hold and transfer the glass in a floating state by a gas layer formed of gas, the holding means further comprising a driving chain which is movable in the transferring direction, the driving chain comprising holders for holding the glass sheet in the floating state and a pusher for pushing the held glass sheet when the driving chain is driven.

Further, the apparatus for bend-shaping a glass plate of the present invention may have a moving means to move the glass plate to the level of a post-treating transferring path, which is positioned at the downstream side in the transferring direction of the cooling transferring surface.

Further, the apparatus for bend-shaping a glass plate of the present invention may have a simple bending transferring surface which is positioned at the upstream side in the transferring direction of the complexly bending transferring surface and which has an upwardly projecting simple curved face along the axis perpendicular to the transferring direction.

Further, in accordance with the apparatus for bend-shaping a glass plate of the present invention, there is a transferring surface provided at an upstream side in a transferring direction of said complexly bending transferring surface, said transferring surface being detachable and replaceable so that gradient in the transferring direction is gradually changed to have a predetermined gradient depending on the upward gradient of the complexly bending transferring surface.

In accordance with the technique described above, the glass plate transferred along the transferring surface located in the shaping furnace is heated to the nearly glass softening temperature in the shaping furnace so that it is shaped by its deadweight to have a complexly curved face which corresponds to the shape of the transferring surface; the glass plate is cooled and strengthened by means of the cooling and strengthening means; and then, it is introduced in the post-treating transferring path which transfers the glass plate to a place where a post-treatment such as washing is carried out.

In such a technique, any type of shaping furnace for bend-shaping a glass plate may be used as far as the shaping furnace includes a heating means for heating the glass plate as an object to be shaped to the temperature of softening and a transferring surface for transferring thereon the glass plate. In this case, the heating means may be of a type using a radiation heat by a heater. Further, the heating means may be of such a type that a hot gas is ejected from the lower part of the hearth beds which are normally constituted by refractory bricks, through apertures formed in the hearth beds so that the glass plate is heated to nearly the glass softening temperature. In the later case, the glass plate is held in a floating state by a layer formed of the gas. This means that the hearth beds of the shaping furnace constitute the above-mentioned transferring surface. The discharging of the hot gas from the lower part of the hearth beds eliminates the contact of the glass plate to the transferring surface, and accordingly, a flaw on the glass plate is prevented from occurring during the transfer. This is a preferable embodiment from the viewpoint of preventing a flaw on the glass plate.

The design of the glass plate cooling and strengthening means may be changed as desired as far as the glass plate can be strengthened in the shaping furnace while the shape of the shaped glass plate can be kept. It is in particular preferable to use the glass plate cooling and strengthening means having such a construction that a cooling air blowing port module group wherein a number of nozzle-like blowing ports are arranged with appropriate intervals above and below the transferring path for transferring the glass plate, are provided whereby the glass plate is cooled and strengthened from the upper and lower parts by air ejected from the blowing ports. Such construction is desirable from the viewpoint of uniformly strengthening the glass plate. Further, it is possible to carry out cooling operation in two stages: the primary cooling wherein the glass plate is cooled to a temperature lower than the distortion point while it is uniformly strengthened, and the secondary cooling wherein the glass plate is cooled to the substantially room temperature. The investment for the cooling blowing port module can be saved if the module group is used for only the primary cooling.

As means for transferring the glass plate in the present invention, there are the complexly bending transferring surface positioned in the shaping furnace, which has a complexly curved face so as to upwardly project along both the axis of the transferring direction and the axis perpendicular to the transferring direction and which has an upward gradient portion at at least an area near the exit of the shaping furnace, and the cooling transferring surface which has a complexly curved face so as to be substantially continuous to that of the complexly bending transferring surface and which has a downward gradient portion in at least a part of it.

The complexly bending transferring surface is formed of a continuous surface which has substantially the same radius of curvatures as the surface of the glass plate to be shaped. Namely, it has a complexly bending surface which is different from a transferring surface in a waveform which is provided by, for instance, an arrangement of rollers, but it has a continuous smooth surface provided by a single hearth bed. Alternatively, there may be a complexly bending transferring surface positioned in the shaping furnace, which has a complexly curved face so as to downwardly project along both the axis of the transferring direction and the axis perpendicular to the transferring direction and which has a downward gradient portion at at least an area near the exit of the shaping furnace, and a cooling transferring surface which has a complexly curved face so as to be substantially continuous to that of the complexly bending transferring surface and which has an upward gradient portion in at least a part of it. The difference of the transferring surfaces between the former case and the later case is only the direction of the projection of the curved surfaces, and they can be considered to be substantially the same. Accordingly, description will be made as to the former case, namely, the case of forming a glass plate having a complexly curved face which projects upwardly.

The inclination angle of the upward gradient can be determined depending on the shape of a glass plate to be shaped. The radius of curvature of the transferring surface is also determined so as to correspond to a shape with which the glass plate is shaped. In the present invention, it is preferable that the radius of curvature along the axis perpendicular to the transferring direction is 500 mm or longer, more preferably, 1,000 mm or longer, and the radius of curvature along the axis of the transferring direction is 10,000 mm or longer, more preferably, 20,000 mm or longer.

The radius of curvature of the transferring surface can be optionally determined depending on a position on the transferring surface. For instance, the radius of curvature can be large at the initial stage of transferring and is gradually decreased toward the downstream side of the transferring path, whereby the glass plate has a shape substantially corresponding to a. predetermined shape of bend in the area near the exit of the shaping furnace.

In the present invention, glass plates having various shapes of complexly curved face can be produced depending on needs. In this case, it is preferable to add a moving means at the downstream side in the transferring direction of the cooling transferring surface to thereby move the glass plate to the level or the height of the post-treating transferring path, from the standpoint that an existing manufacture line for glass plates having a simply curved face can be easily applied to manufacture glass plates having a complexly curved face. With the moving means, it is possible to transfer the glass plates to the post-treating transferring path by simply adjusting an angle of inclination of the moving means wherein the post-treating step is unchanged, whereby various kinds of glass plate having different kinds of radius of curvature can be easily produced. Any type of moving means, i.e. a disk conveyor, a belt conveyor or the like can be utilized as far as it can move the glass plate.

It is effective to provide a transferring surface having a predetermined gradient which is changeable as desired, at an upstream side in the transferring direction of the complexly bending transferring surface. The transferring surface is adapted to change the e;gradient depending on a shape of the glass plate to be formed to have a complexly bent surface. For instance, when the complexly bending transferring surface have a relatively large upward gradient portion, the transferring surface formed to have a certain upward gradient is disposed at the upstream side of the complexly bending transferring surface. On the other hand, when the upward gradient portion of the complexly bending transferring surface is not so large, the transferring surface capable of transferring the glass plate horizontally until the complexly bending step is conducted, is provided. Namely, the transferring surface disposed at the upstream side of the complexly bending transferring surface is so adapted that the upward gradient can be gradually increased so as to correspond to a large upward gradient of the complexly bending transferring surface.

In a case where it is necessary to bend-shape a glass plate deeper along only one direction as a windshield glass for automobile (one direction means the horizontal direction when the windshield glass is attached to an automobile), it is preferable to provide a simple bending transferring surface at the upstream side of the complexly bending transferring surface, wherein the simple bending transferring surface has a predetermined radius of curvature which curves along only the axis perpendicular to the transferring direction. In this case, a bending operation may be applied to a glass plate along the axis perpendicular to the transferring direction, before forming a complexly bending face, by transferring the glass plate on the simple bending transferring surface in the shaping furnace so that the direction of bending the glass plate to have a smaller radius of curvature coincides with the direction perpendicular to the transferring direction.

Further, in the above-mentioned case, if there is a difference in inclination near the boundary between the complexly bending transferring surface and the simple bending transferring surface, a glass plate may contact with the complexly bending transferring surface when the glass plate passes the boundary region, so that a strain or a defect may take place in the glass plate. In the present invention, however, occurrence of such a strain or defect can be prevented since a transferring surface inclined to have a slightly upward gradient portion in the transferring direction, i.e., the simple bending transferring surface in this specified case, is disposed at the upstream side of the complexly bending transferring surface so as to be inclined so that the simple bending transferring surface is slightly inclined upwardly in the transferring direction. When there is a difference in inclination between the simple bending transferring surface and the complexly bending transferring surface, the glass plate may be reversely bent at the boundary region. However, this causes no problem because the glass plate is shaped in the final shape above the complexly bending transferring surface after it has been passed through the boundary region.

DESCRIPTION OF THE PREFERRED EMBODIMENTS

Preferred embodiments of the process for bend-shaping a glass plate of the present invention and apparatus for carrying out the process will be described in detail with reference to the drawings.

Figure 1:
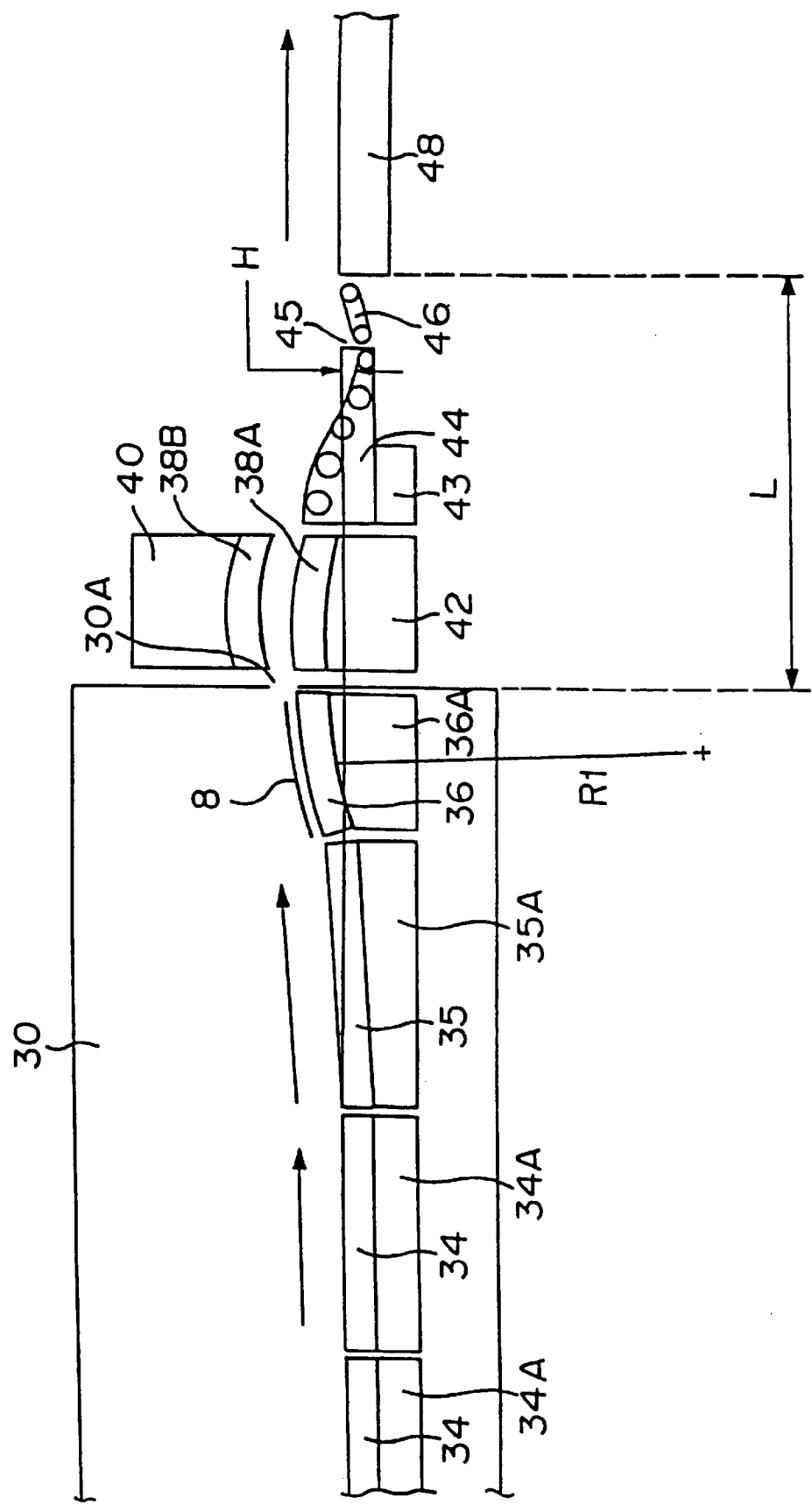
FIG. 1 is a schematic view showing in its entirety an embodiment of the glass plate bending apparatus according to the present invention.
Figure 2:
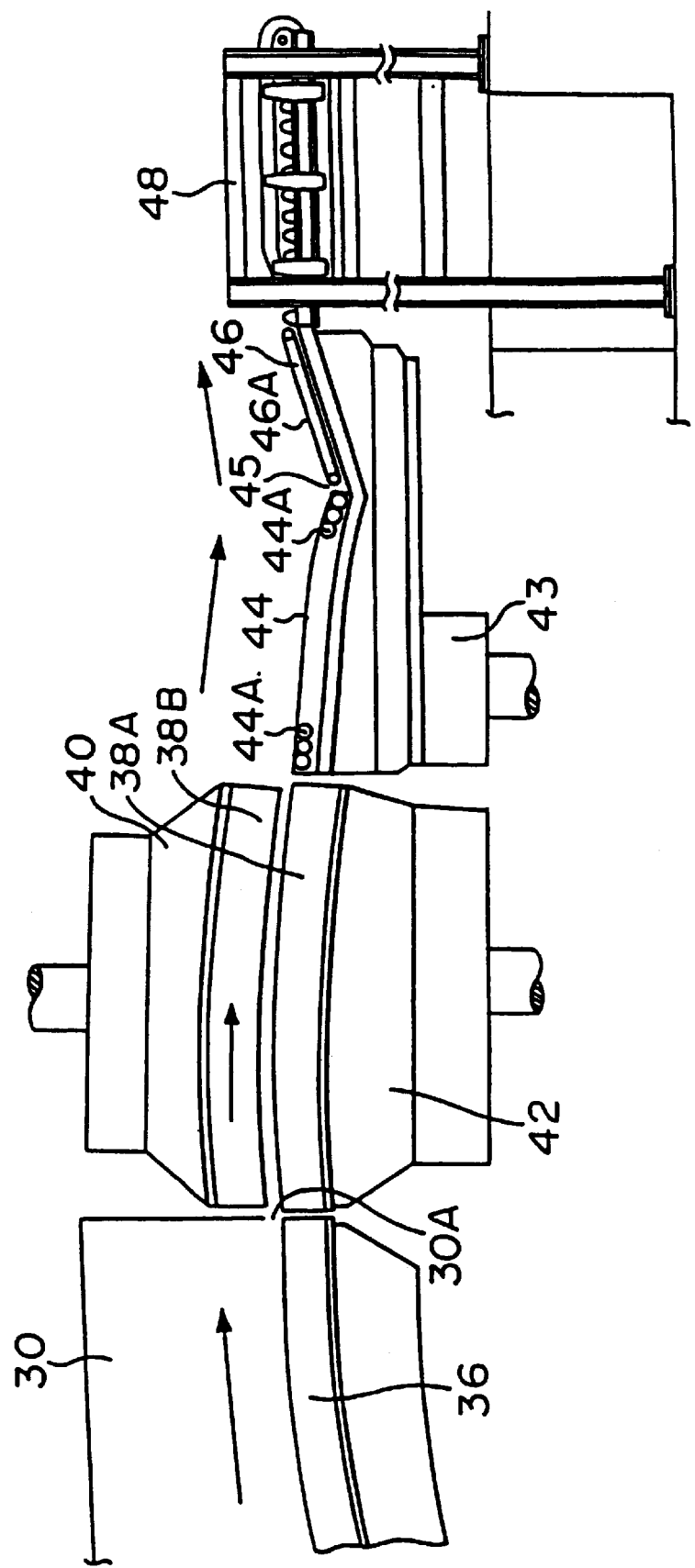
FIG. 2 is an enlarged view of an important portion of the glass plate bending apparatus of the present invention.
Figure 3:
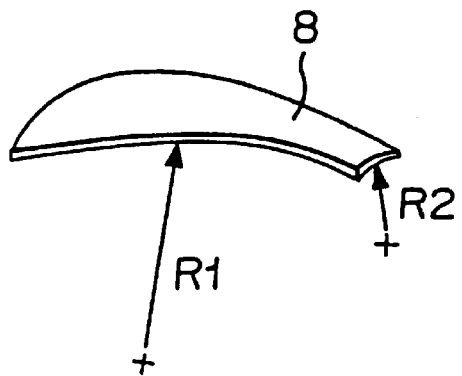
FIG. 3 is a perspective view of a glass plate bend-shaped to have a complexly curved face.
Figure 4:
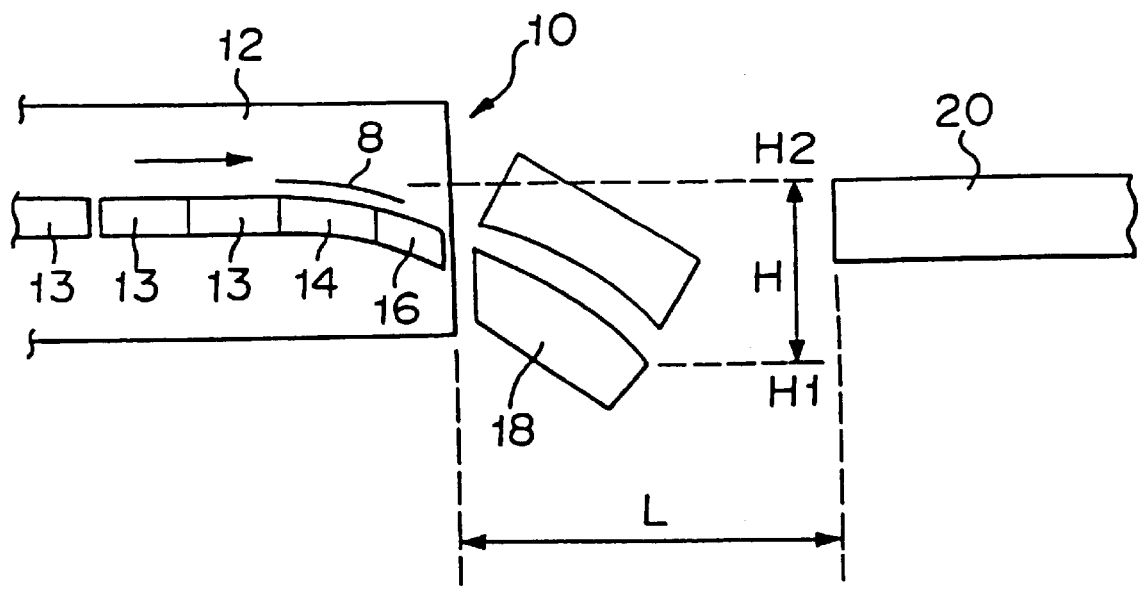
FIG. 4 is a diagram partly omitted of a conventional glass plate bend-shaping apparatus.

FIG. 1 is a side view of an embodiment of the glass plate bend-shaping apparatus according to the present invention, and FIG. 2 is an enlarged view of an important portion of the bend-shaping apparatus. In a gas heating furnace 30 as a shaping furnace, there are provided an array of hearth beds 34, 34, ... and a hearth bed 35 which constitute a transferring surface for a glass plate 8 for transferring the plate in a moving direction (i.e., first direction); and which form a simply bending transferring surface. The surfaces of the hearth beds 34, 34, ... and the hearth bed 35 respectively have an upwardly projecting curved face with a radius of curvature R2 which are formed along a directional axis (i,e., second direction) perpendicular to the moving direction of the glass plate 8. The hearth beds 34 are arranged in a substantially horizontal direction with respect to the transferring direction, and the hearth bed 35 is arranged to have a slightly upward gradient face with respect to the transferring direction and which forms a peak. The surfaces of the hearth beds 34, 34, ... and the hearth bed 35 are respectively inclined 3°–4° around the axis in the transferring direction.

Figure 5:
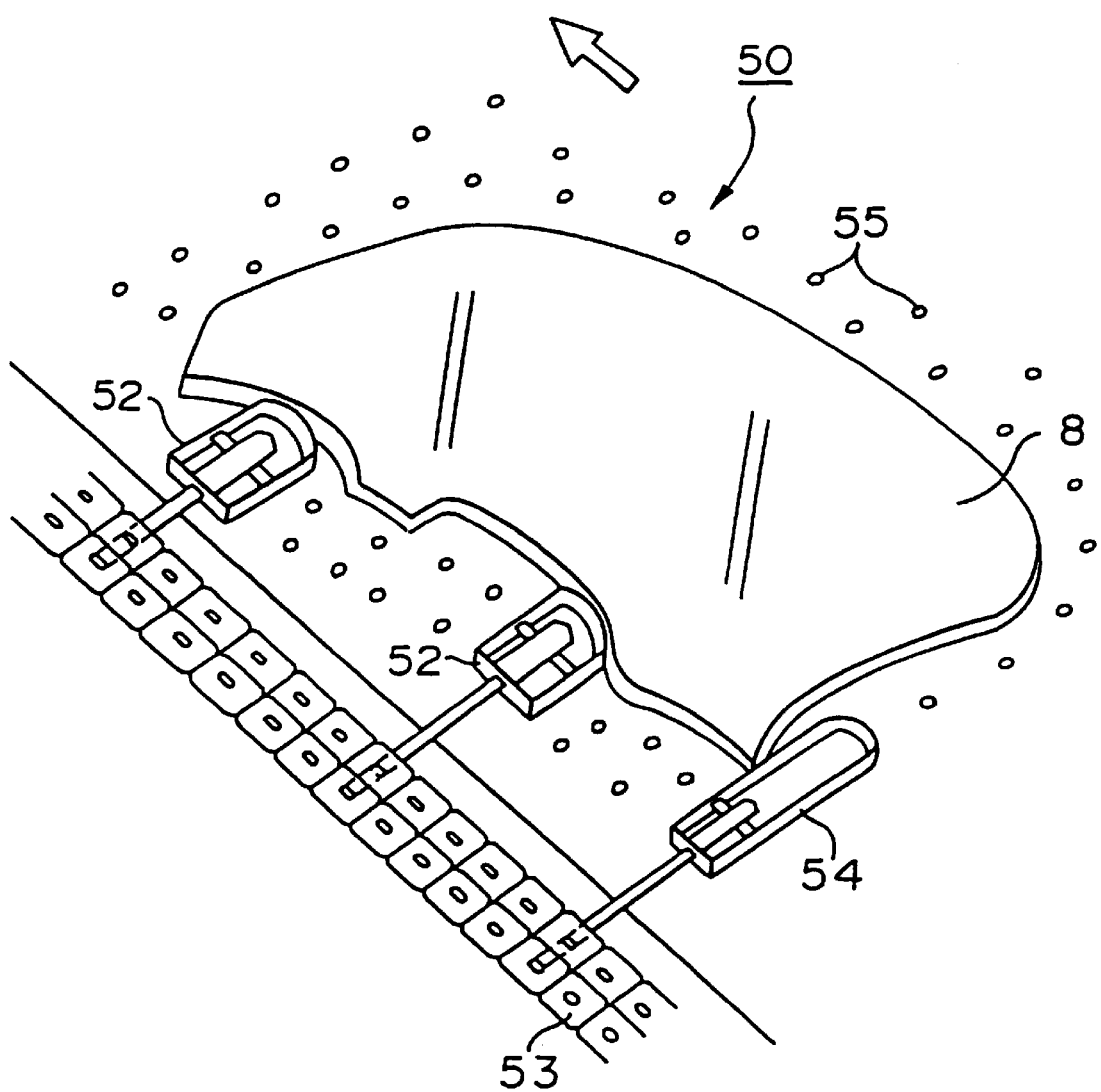
FIG. 5 is a perspective view showing an embodiment of the glass plate moving means used for the present invention.

The glass plate 8 is held in a floating state above the hearth beds, 34, 34, ... and the hearth bed 35 by means of a gas layer formed of gas blown from the lower part of the hearth beds. In FIG. 1, reference numerals 34A, 34A, 35A and 36A respectively designate gas chambers provided at the lower part of the hearth beds, which blast gas to hold the glass plate in a floating state above the surface of the hearth beds. In the state that the glass plate 8 is held in a floating state above the hearth beds 34, 35, the glass plate is contacted and engaged through holders for driving disks in an operable manner with a driving chain 53 which is disposed along a side in the moving direction of the hearth beds of the gas furnace 30, as shown in FIG. 5. On the movement of the holders, the glass plate 8 is continuously transferred above the hearth beds 34, 34, ... and the hearth bed 35. During the transfer of the glass plate, the glass plate is heated to a predetermined temperature near the softening point, and it is bend-shaped by its deadweight into a shape substantially corresponding to the curved shape of the surface of the hearth beds 34, 35.

Between the hearth bed 35 and the exit or outlet opening 30A of the gas furnace 30, there is arranged a final hearth bed 36 which has a convexly curved face with a radius of curvature R2 formed along the directional axis perpendicular to the moving direction and a curved face with a radius of curvature R1 formed along the axis of the moving direction and which has an upward gradient.

Outside the gas furnace 30, there is provided a cooling transferring surface which is substantially continuous with the hearth bed 36 and has the substantially same curved shape (i.e. the radii of curvature R1, R2) and a cooling port module group 38A having a quenching bed which blasts cooling air to the glass plate to thereby serve as a cooling surface, whereby the module group 38A forms a downward gradient face. Above the cooling port module group 38A, a cooling port module group 38B having the construction similar to the module group 38A is placed opposing the module group 38A, whereby the glass plate 8 to be passed between the cooling port module groups 38A, 38B is rapidly cooled and strengthened. Cooling port boxes 40, 42 are respectively air chambers connected to the cooling port module groups 38A, 38B.

Any type of transferring means can be used as far as it can transfer the glass plate in the shaping furnace. In particular, FIG. 5 shows an embodiment of the transferring means capable of heating the glass plate by feeding hot gas from the lower part of the hearth beds. The glass plate 8 is held in a floating state through a gas layer formed of gas blown through apertures on ejection holes 55 formed in the hearth bed 50, and is transferred in the direction indicated by an arrow mark. The hearth bed is inclined in a range from 1° to 5°, preferably 2° to 4° around the transferring direction with respect to the horizontal direction. Further, a driving chain 53 which is driven in the direction of transferring the glass plate is disposed in the vicinity of the lower side of the inclined hearth bed 50. Further, the driving chain 53 is provided with holders 52, 52 and a pusher 54 which hold the glass plate. When the driving chain 53 is driven in the arrow mark direction, the holders 52, 52 and the pusher 54 hold the glass plate 8 to transfer it. The embodiment as shown in FIG. 5 is one example of possible transferring devices, and the present invention is not limited to this embodiment.

A disk conveyor 44 is located at the downstream end of the cooling air blowing port module group 38A. The disk conveyor 44 has a downward gradient extending from the right end of the cooling air blowing port module group 38A to a position indicated by reference numeral 45 as shown in FIG. 1. In the disk conveyor 44, heat-resisting rubber is applied on the circumferential surface of the existing disk rollers 44A and a heat-resisting plastic ring of a material such as bakelite is attached onto the circumferential surface of the heat-resisting rubber.

Figure 6:
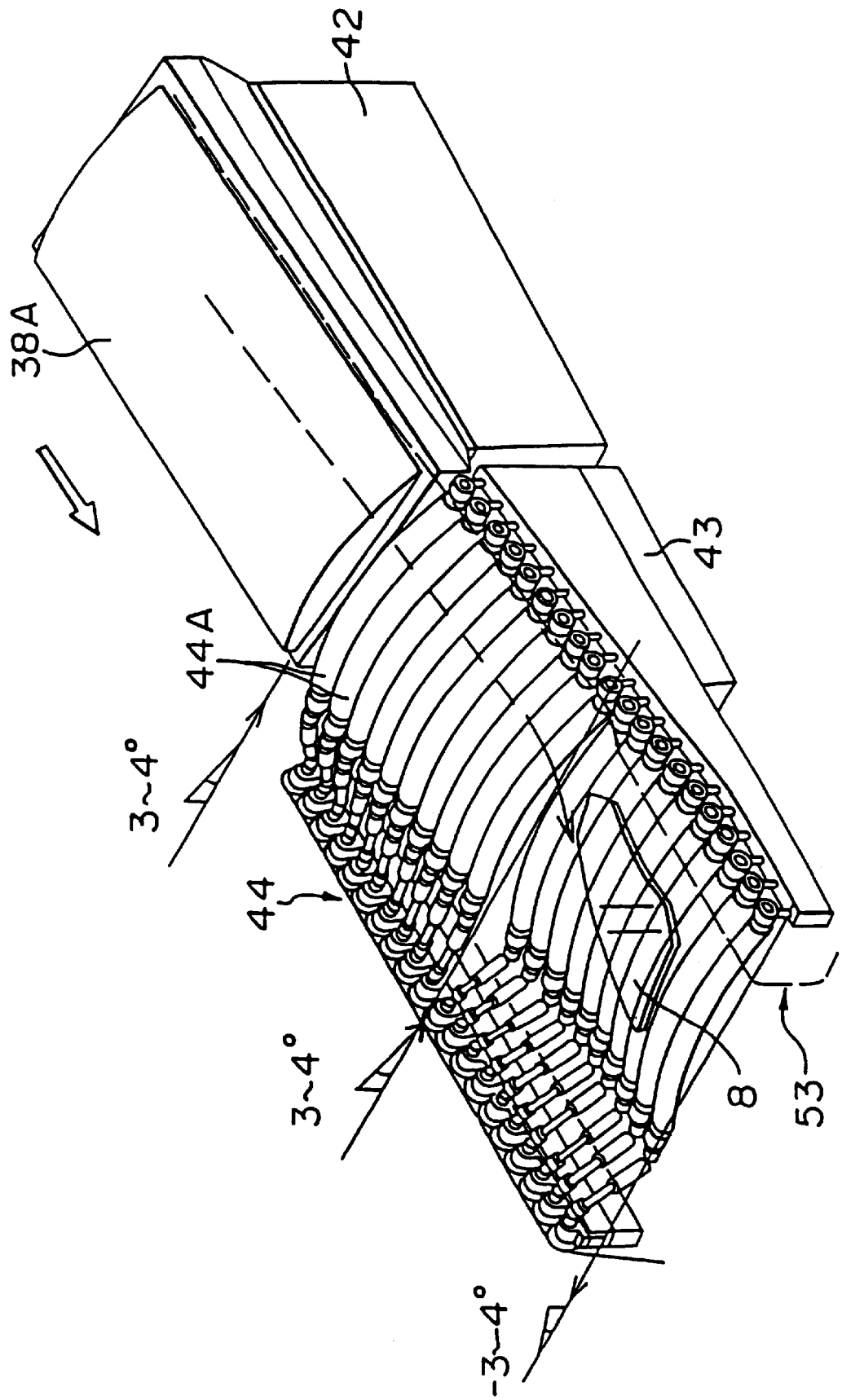
FIG. 6 is a perspective view of an important portion of a device in the cooling step according to the method of the present invention.

In this specified example, the cooling step comprises two steps. FIG. 6 illustrates in a perspective view a device for carrying out the cooling step in the two steps. In the first step, the glass plate 8 is transferred on the cooling air blowing port module group 38A during which the glass plate 8 is rapidly cooled and is uniformly strengthened (primary cooling). In FIG. 6, the cooling air blowing port module group 38B placed above the module group 38A is omitted. In the secondary step, the glass plate 8 is transferred on the disk conveyor 44 while it is further cooled by air through a blowing port 43 provided at the lower part of the disk conveyor 44. The glass plate 8 is cooled separated from a holder (FIG. 5) to be carried to the next step (secondary cooling).

The separation of the glass plate from the holder is not particularly limited. However, two ways of separation are exemplified as preferred processes. In the first process, the driving chain 53 and the holder attached thereto are directed upwardly from the level of the transferring surface in the vicinity of a position where the glass plate 8 is cooled to the room temperature, and at the same time the revolution speed of the disk roller 44A is increased about 1%–5%. In the second process, the inclination around the transferring direction of the transferring surface is gradually changed toward the transferring direction. Namely, the transferring surface inclined toward the driving chain 53 is changed so as to incline to the direction opposite the driving chain 53 as the glass plate is moved into the transferring direction, whereby the glass plate 8 is shifted by its deadweight on the transferring surface. In the case of this embodiment, since the shape of the transferring surface is determined by the shape which is formed by the circumferential surface of the disk rollers 44A, it is necessary to gradually change the shape of the circumferential surface of the disk rollers 44A toward the downstream side of the transferring direction in order to shift the glass plate 8 on the transferring surface according to the second process. Thus, it is preferable to use expand rollers as the disk rollers in order to gradually change the inclination of the disk rollers 44A. The expand rollers preferably have a spring of a heat-resisting metal such as stainless steel inside the surface layer made of the heat-resisting rubber. Accordingly, the radius of curvature and the inclination of the front surface of the disk roller can be desirably determined by determining the position of the both ends of the rollers. FIG. 6 illustrates such a device used in the cooling step wherein the expand rollers are used.

At the downstream end in the transferring direction of the disk conveyor 44, there is provided in a continuous manner a belt conveyor 46 having an upward gradient which moves the glass plate 8 to a belt conveyor 48 which is used for a post-treating step, and the upper end of the belt conveyor 46 is determined to have the substantially same level as the belt conveyor 48 for a post-treating step. A heat-resisting V-belt 46A is used for the belt conveyor 46.

In case that the levels of the downstream end of the disk conveyor 44 and the post-treating belt conveyor 48 are the substantially same, it is possible to directly transfer the glass plate 8 from the disk conveyor 44 to the post-treating belt conveyor. In such case, it is unnecessary to provide the belt conveyor 46; thus, it is extremely desirable from the viewpoint-of simplifying equipment.

However, it is not always in agreement of the transferring distance needed for the bend-shaping the glass plate with the transferring distance needed for the quenching the glass plate. The transferring distances are changed depending on a requisite complexly curved face of glass plate. Accordingly, it is preferable in practical use to satisfy various specifications of the shape of glass plates by adjusting the inclination angle of the belt conveyor 46 for transferring the glass plate.

Namely, in accordance with the present invention, it is possible to arrange to a fair extent the level of the downstream end in the transferring direction of the disk conveyor 44 by adjusting the gradient of the hearth beds 34, 35, 36 and the gradient of the cooling air blowing port module group 38A, in spite of the specifications of the glass plate. Accordingly, it is possible to satisfy a change of the specification by slightly adjusting the gradient of the belt conveyor 46. Further, the gradient of the above-mentioned hearth beds or the other elements may be adjusted so that the difference between the level of the downstream end in the transferring direction of the disk conveyor 44 and the level of the post-treating conveyor 48 is slight. Accordingly, it is not always necessary to determine the gradient of the belt conveyor 46 to be steep and accordingly, extremely stable transferring operation is obtainable.

The function of the apparatus for carrying out the process of the present invention will be described.

The glass plate 8 is transferred on the hearth beds 34, 34, . . . and the hearth bed 35 in the gas furnace 30, during which it is bend-shaped with a predetermined radius of curvature R2 along the axis perpendicular to the transferring direction and is heated to a high temperature necessary for quenching. When the glass plate 8 passes through the hearth bed 35 and reaches the upper surface of the hearth bed 36 which is provided near the exit 30A of the gas furnace 30 and which has a predetermined radius of curvature R1 along the axis of the transferring direction so as to have at least a portion of bed 36 curved in the first direction so as to be upwardly convex in such direction the glass plate is bend-shaped with the radius of curvature R1 in the longitudinal direction along the curved shape of the hearth bed 36, whereby the glass plate 8 is bend-shaped to have a complexly curved face having the radius of curvature R2 in the width (i.e., second) direction and the radius of curvature R1 in the longitudinal direction.

The glass plate 8 formed to have a complexly curved face is taken out through the exit 30A of the gas furnace 30 and is transferred onto the cooling air blowing port module group 38A where it is cooled to about 400° C. and is strengthened by the cooling air from the blowing ports 40, 42 through the cooling air blowing port module groups 38A, 38B. The cooled glass plate 8 is descended along the disk conveyor 44 and is further cooled by the cooling air through the blowing port 43 without using a cooling air blowing port module group. After the glass plate 8 has had a predetermined shape and strength, it is separated from the holder attached to the driving chain 53 and is further delivered to the post-treating belt conveyor 48 through the belt conveyor 46 which has an upward gradient surface.

In a case that the glass plate 8 is bend-shaped to have a simply curved face wherein the glass plate has a curved face along only the width direction as often seen in a conventional method of bend-shaping glass plates, the hearth bed 35 having an upward gradient and the hearth bed 36 having a curved surface which are disposed near the exit 30A of the gas furnace 30 and the cooling air blowing port module group 38A, the disk roller 44 and the belt conveyor 46 which are located outside the gas furnace 30 may be replaced by a hearth bed for a simply bend-shaping and a disk roller so that they are continuous with the hearth beds 34, 34, . . . and the post-treating conveyor 48. Thus, some of the existing equipments can be utilized. With this arrangement, the glass plate 8 is bend-shaped along the width direction of it so as to correspond to the shape of the surfaces of the hearth beds 34, 34, . . . while the glass plate 8 is transferred therethrough in the same manner as described above.

Thus, in accordance with the present invention, since the glass plate 8 is bend-shaped along the longitudinal direction and it is once ascended, the amount of decrese in elevation H of the glass plate 8 can be made small. Accordingly, although the distance L between the gas furnace 30 and the post-treating conveyor 48 is short in the existing production line for bend-shaping the glass plate 8 in the direction along only its width, the glass plate 8 can be raised from the level H1 of the falling position to the level H2 of the post-treating conveyor 48. Thus, a manufacture line for bending glass plates wherein the shaping furnace and the other major portion of equipments in the existing manufacture line for bending glass plates can be commonly used and glass plates having a complexly curved face can be formed by simply replacing a part of the existing manufacture line, can be obtained.

In accordance with the process for bend-shaping a glass plate and the apparatus for carrying out the process of the present invention, a glass plate which has been bend-shaped along the direction perpendicular to the transferring direction in the gas furnace is once raised in the gas furnace, followed by bend-shaping it along the transferring direction, and the glass plate is taken out from the gas furnace, and is descended while cooled and strengthened, whereby the difference in height between the position at which the glass plate cooled and strengthened and the position of the post-treating belt conveyor can be small, and the handling of the bend-shaped glass plate can be easy. Accordingly, the glass plate can be bend-shaped to have a complexly curved face by bending it in the transferring direction and the direction perpendicular to the transferring direction with use of existing equipments of manufacture such as a shaping furnace, even when the distance between the existing gas furnace and the post-treating conveyor is short.

Particularly, when ceramic type coating including glass frit is formed by baking on the glass plate, for instance, a glass plate for an automobile in which case the coating is usually applied at the cabin side, namely, the coating is formed at the peripheral portion of a concaved side of the curved glass plate, there may cause a contact of the coating on the glass plate with transferring rollers during melting and baking steps of the coating, whereby a part of the coating may be peeled off or is transferred to a needless portion. In accordance with the present invention, such defect of the coating does not occur because the glass plate does not come to contact with the transferring surface during the melting and baking steps. Further, in the present invention, since the glass plate does not come to contact with the transferring surface, the coating portion may be formed either side of the glass plates or both sides of it. Accordingly, the optimum shape of complexly bending transferring surface can be selected in correspondence to the shape of the glass plate having a complexly bending surface.

In accordance with the present invention, the existing equipment of the manufacture line for glass plates can be further flexibly used to obtain glass plates having a complexly curved face.

Additionally, a process of bend-shaping glass plates and an apparatus which reduces the space can be presented in a case that a glass plate is required to be deeply bend-shaped in only one direction of the glass plate as required in the ordinary glass plate for automobile.

Also, a process for obtaining a curved glass plate of high quality wherein a danger of occurring a strain in the glass plate during transfer is minimized because the glass plate does not contact with the transferring surface, and an apparatus for carrying out the process can be provided.

What is claimed is:

1. An apparatus for manufacturing a curved sheet of glass, comprising:

a heating furnace for heating a sheet of glass therein, said heating furnace having an outlet opening for discharging a curved sheet of glass; and an array of beds housed in said furnace for transferring the sheet of glass successively over the beds in said furnace in a first direction toward said outlet opening while shaping the sheet of glass complementarily to an upper surface of said beds, each of said beds having a plurality of hot air ejection holes for ejecting hot air to keep the sheet of glass out of contact with said beds;

said beds including a final bed disposed near said outlet opening and inclined upwardly toward said outlet opening, said final bed having an upper panel including at least a portion curved in said first direction near said outlet opening to curve the sheet of glass in said first direction.

2. An apparatus according to claim 1, wherein said portion of the upper panel is upwardly convex in said first direction.

3. An apparatus according to claim 1, wherein said portion of the upper panel is upwardly convex in a second direction transverse to said first direction.

4. An apparatus according to claim 1, wherein said portion of the upper panel is upwardly convex in both said first direction and a second direction transverse to said first direction.

5. An apparatus according to claim 1, further comprising a quenching bed disposed outside of said heating furnace adjacent to said outlet opening, for receiving and quenching a sheet of glass discharged out of said outlet opening.

6. An apparatus according to claim 5, wherein said quenching bed is inclined downwardly away from said outlet opening.

7. An apparatus according to claim 5, wherein said quenching bed has an upper panel including an upwardly convex portion near said outlet opening.

8. An apparatus for manufacturing a curved sheet of glass, comprising:

a heating furnace for heating a sheet of glass therein, said heating furnace having an outlet opening for discharging a sheet of curved glass; and an array of beds housed in said furnace for transferring the sheet of glass successively over the beds in said furnace in a first direction toward said outlet opening while shaping the sheet of glass complementarily to an upper surface of said beds, each of said beds having a plurality of hot air ejection holes for ejecting hot air to keep the sheet of glass out of contact with said beds;

said beds including a final bed disposed near said outlet opening and inclined upwardly toward said outlet opening, said final bed having an upper panel which is upwardly convex in a second direction transverse to said first direction to curve the sheet of glass in said first direction and said second direction.

9. An apparatus according to claim 8, further comprising a quenching bed disposed outside of said heating furnace adjacent to said outlet opening, for receiving and quenching a sheet of glass discharged out of said outlet opening.

* * * * *